United States Patent [19]
Klatt

[11] Patent Number: 5,484,249
[45] Date of Patent: Jan. 16, 1996

[54] GRAIN SEEDER LOADER

[76] Inventor: Dennis Klatt, 1131 Tenth St., Sheldon, Iowa 51201

[21] Appl. No.: 372,919

[22] Filed: Jan. 17, 1995

[51] Int. Cl.⁶ .................................................. B60P 1/40
[52] U.S. Cl. ........................... 414/523; 414/332; 414/526
[58] Field of Search .................................. 414/299–300, 414/303, 332, 471, 482, 486–488, 523, 526

[56] References Cited

U.S. PATENT DOCUMENTS

| | | | |
|---|---|---|---|
| 3,439,819 | 4/1969 | Quanbeck | 414/526 |
| 3,493,136 | 2/1970 | Spellman, Jr. | 414/488 |
| 3,498,483 | 3/1970 | Meharry | 414/523 |
| 3,586,181 | 6/1971 | Brock | 414/332 |
| 4,119,223 | 10/1978 | Fiechter | 414/523 |
| 4,178,123 | 12/1979 | Loeffler | 414/523 |
| 4,312,621 | 1/1982 | Quanbeck et al. | 414/523 |
| 4,701,095 | 10/1987 | Berryman et al. | 414/332 |
| 5,252,020 | 10/1993 | Kinney et al. | 414/488 X |

FOREIGN PATENT DOCUMENTS

| | | | |
|---|---|---|---|
| 0732608 | 3/1932 | France | 414/523 |
| 2447292 | 9/1980 | France | 414/332 |
| 0915027 | 1/1963 | United Kingdom | 414/523 |

*Primary Examiner*—Michael S. Huppert
*Assistant Examiner*—James W. Keenan

[57] ABSTRACT

An elevator device adapted to fill the seed box or boxes of a grain seeder, grain drill or other distribution device for similar particulate material. The elevator mechanism is pivotally mounted on the main device so that the delivery end can be raised to a use position or lowered to a non-use position for transport either in the field or on the road. Because of a pivotal motion, the hopper end moves in an opposite directions. The mounting is unique in providing a simple power device operating in a single direction for movement of the elevator from a transport position to a use position.

5 Claims, 3 Drawing Sheets

GRAIN SEEDER LOADER

BACKGROUND AND SUMMARY OF THE INVENTION

This invention pertains to an elevator mechanism designed to operate in combination with a distributor for particulate material such as a grain seeder. The elevator is adapted to be carried by the seeder. When it is to be used, the elevator hopper is lowered to a level where it can easily be filled with seed. Lowering the hopper raises the discharge end of the elevator above the seed bin on the seeder so that the seed can be readily moved from the hopper to the seed bin. When the seeder is in use or is being transported, the hopper is raised where it will be out of the way.

Seeders or grain drills have long been used to plant small grain crops such as oats, barley or wheat. The earliest drills were not large and had bins that could readily be loaded by hand. As the size of equipment used in agriculture has increased in size, the size of planting mechanism has also grown with the result that the seed bin has had to be raised to make room for the planting mechanism.

The raising of the bin has created problems in getting the grain conveniently into the seed bin. Shovelling the grain into the bin by hand is not only slow but tiring. Use of a separate piece of equipment such as a portable elevator is also slow requiring placement of the elevator at least once with each filling—and often requiring more locations than that to make reasonably sure of even distribution within the bin.

By the present invention, an elevating device is provided which is permanently placed, can be easily moved to provide even distribution in the seed bin, and can be moved out of the way for easy transport in the field and on the road.

DESCRIPTION

Figure 1:
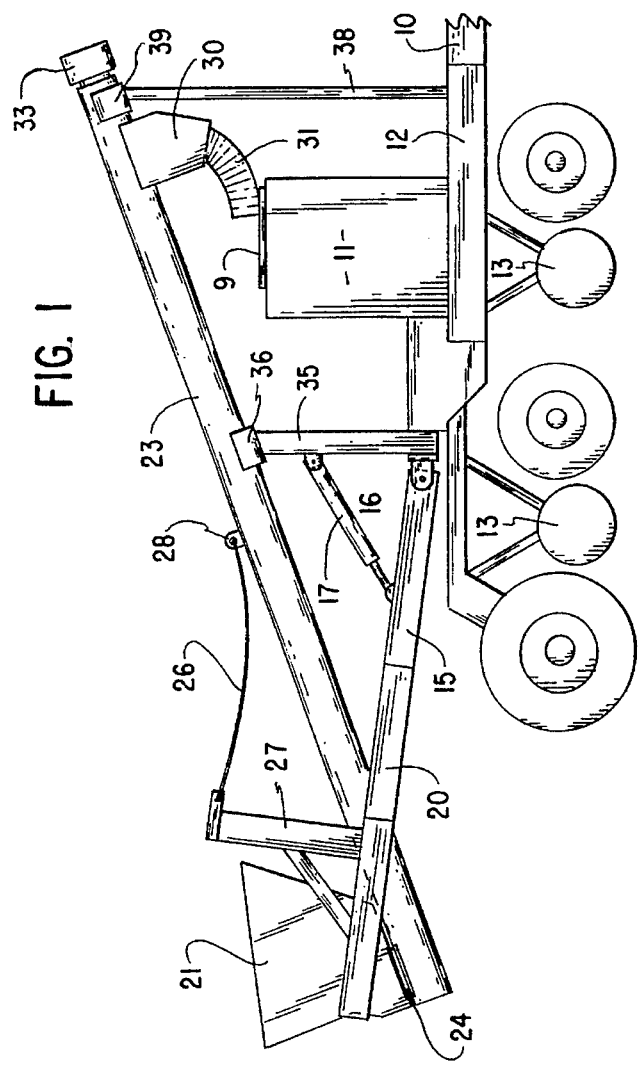
FIG. 1 is a side elevational view of the elevator device in place on a seeder and in position for transport.
Figure 2:
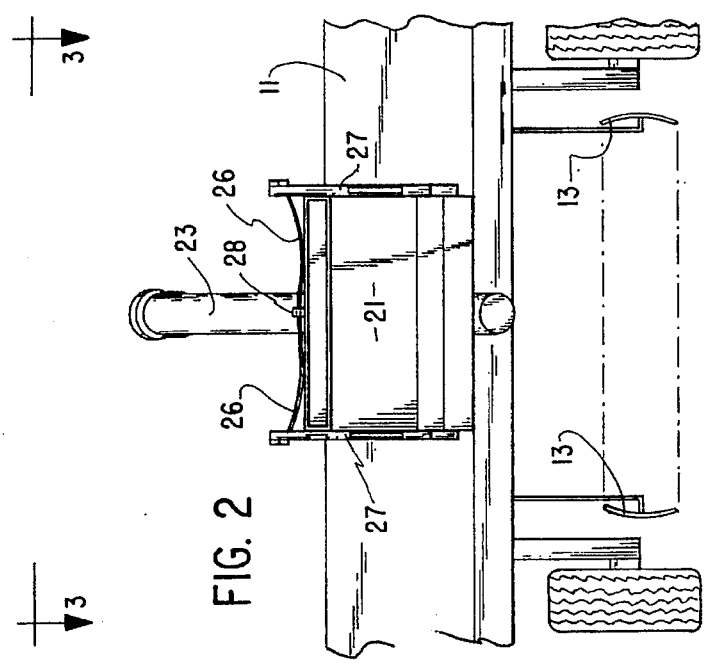
FIG. 2 is a partial rear elevational view of the combination of FIG. 1.

Briefly this invention consists of a combination of a material distribution device such as a grain seeding machine with an attached specialized loading device adapted to fill the bin of the spreader from a hopper, and to spread the material relatively evenly in the bin.

More specifically, and referring to the figures, this invention is described as being used in connection with an ordinary grain seeding device having a tongue 10 adapted to be pulled by a farm tractor. The seeder includes a bin 11 mounted on a frame 12 above a set of colters 13. Seed from the bin 11 falls through seed chutes (not shown) into the seed bed as prepared by the colters.

The problem solved by the present invention is the filling of the bin 11. As machinery on the farm gets larger, work formerly done by hand becomes increasingly difficult. With current large machinery, the opening at the top of the bin has become so high that hand filing of the bin is beyond possibility. Therefore, mechanical means are necessary. A closure cover 9 may be provided to protect the seeds in the bin 11 when it is not being filled.

The present invention provides an efficient and convenient mechanical means for filling the bins. The device is mounted on an arm 15 pivotally attached to the frame 12 at a pivotal axis 16. The position of this arm 15 relative to the frame 12 is controlled by a hydraulic piston and cylinder assembly 17 operable from the tractor's hydraulic system. The arm 15 is generally "Y"-shaped having two arms 20 spreading apart to carry a hopper 21 into which the seeds can easily be loaded.

Figure 5:
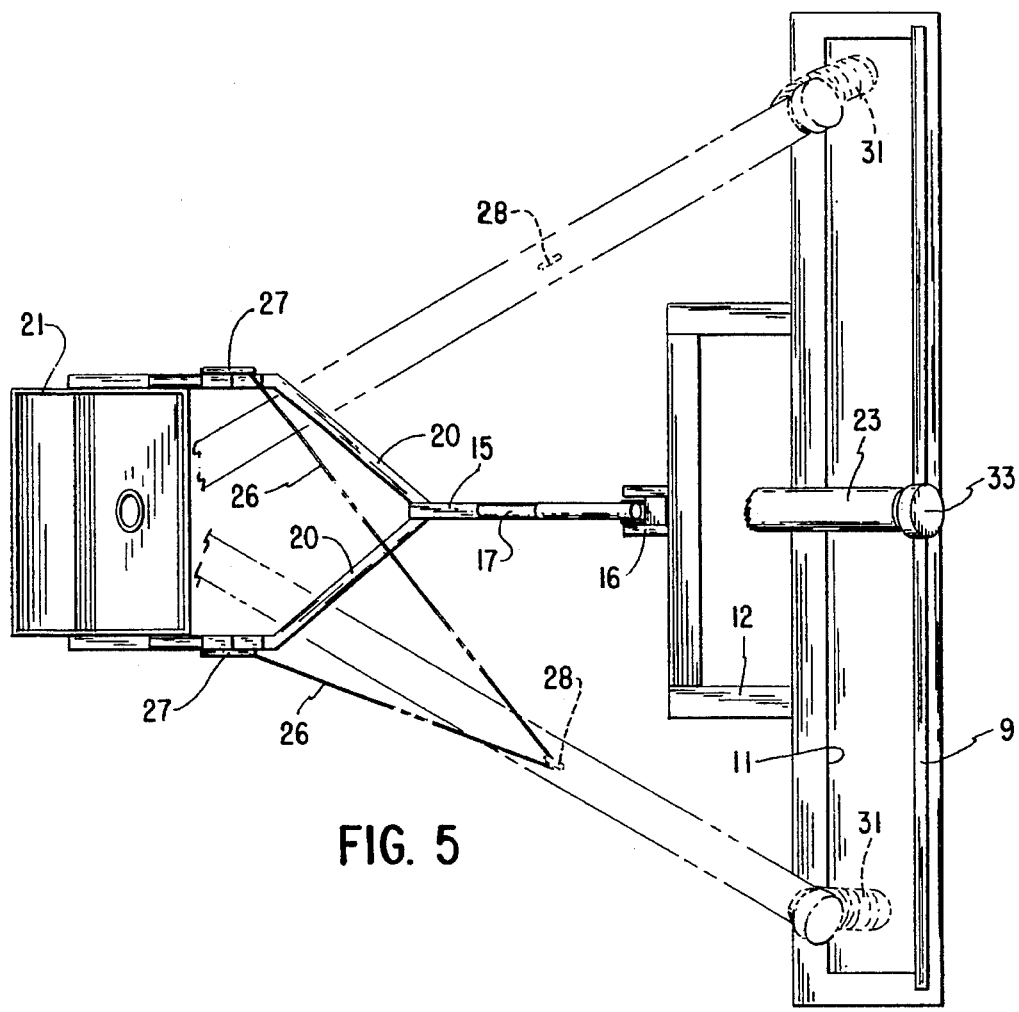
FIG. 5 is a top plan view of the mechanism shown in FIG. 4, and showing alternate lateral positions of the discharge end of the elevator.
Figure 4:
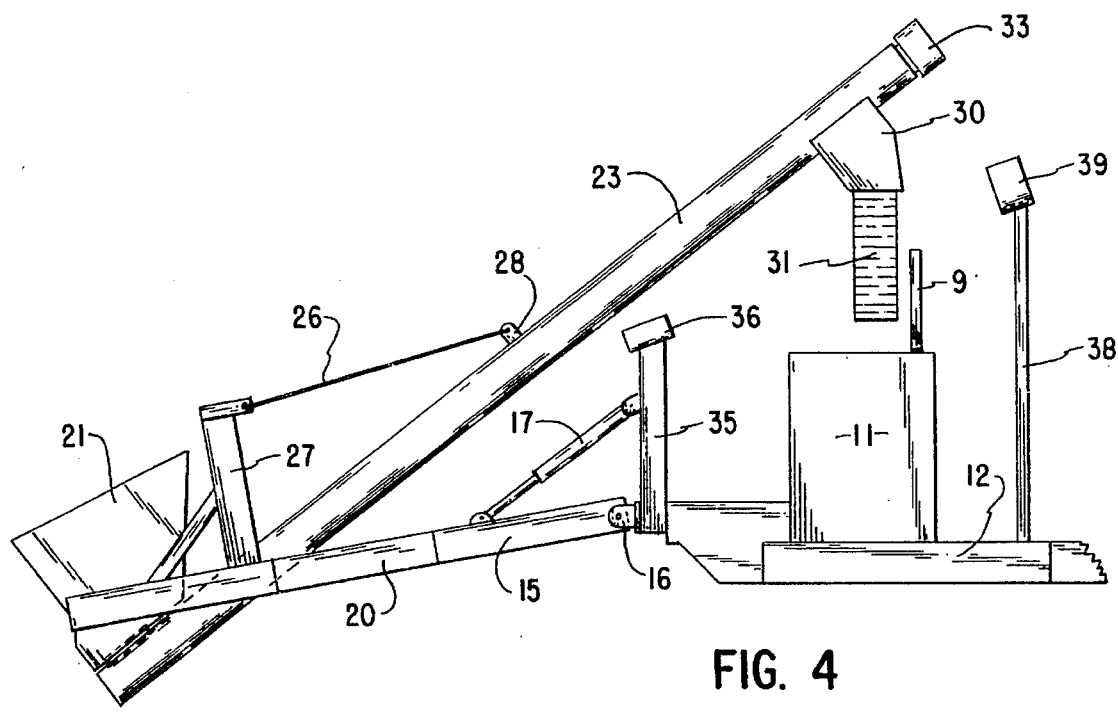
FIG. 4 is a partial side elevational view showing the elevator in its use position and omitting much of the details of the seeder.

An elevator 23, preferably of the auger type, is mounted on the bottom of the hopper 21 and includes a swivel mounting 24 which allows the tube of the elevator 23 to be swung from side to side in an arc at least wide enough to cover the bin 11. The angular relation of the tube of the elevator 23 relative to the hopper 21 is controlled somewhat flexibly by a cable 26 or the like. This cable runs between upright posts 27 and a loop 28 on the elevator. Such an arrangement is useful when the elevator is operating so that the discharge spout 30 can be moved across the bin 11 as shown in FIG. 5. A flexible tube 31 may be used to adjust for the fact that the path of a discharge spout 30 is arcuate in shape and does not strictly follow a straight line over the bin 11. A motor 33 drives the flighting within the elevator. This motor may be driven by the electric or hydraulic system of the pulling tractor, or by an electric motor driven from external sources since it will be used only where the seed or other material is available. Although the elevator is described as an auger type, and that is certainly a preferred type, it is possible that an open trough type elevator might be adapted to use in this combination. Therefore, the material is carried through a trough whether an open U-shaped trough or a closed tubular trough.

When the elevator 23 is not functioning as, for example, when the seeder is driven over the field, the tube may rest in supports as shown. A middle support is provided by a post 35 mounted on the frame 12 of the seeder. A V-shaped or U-shaped receiving block 36 may be provided atop the post 35 to cradle the elevator 23 near its midsection.

Support for the elevator 23 at its outer end and for the motor 33 may also be provided. As illustrated, this support also includes a vertical post 38 mounted on the frame 12 and carrying a receiving yoke 39 to cradle the outer end of the elevator tube on the motor 33. Thus, the elevator is completely supported when in its carried position.

In use, when the bin 11 is to be filled, the hydraulic mechanism 17 allows the hopper 21 to drop toward the ground. Because of the location of the pivotal axis 16, the dropping of the hopper 21 causes the spout 30 to rise off its supports and into position to discharge material from the tubes 31 into the hopper 11. The door 9 will have to be open, and the tube 31 may need to be inserted into the opening on top of the hopper—although with proper proportions, the tube 31 will simply fall into place. Material placed into the hopper can then be elevated into the bin 11 as the outer end of the elevator is moved laterally to distribute material in the bin.

Figure 3:
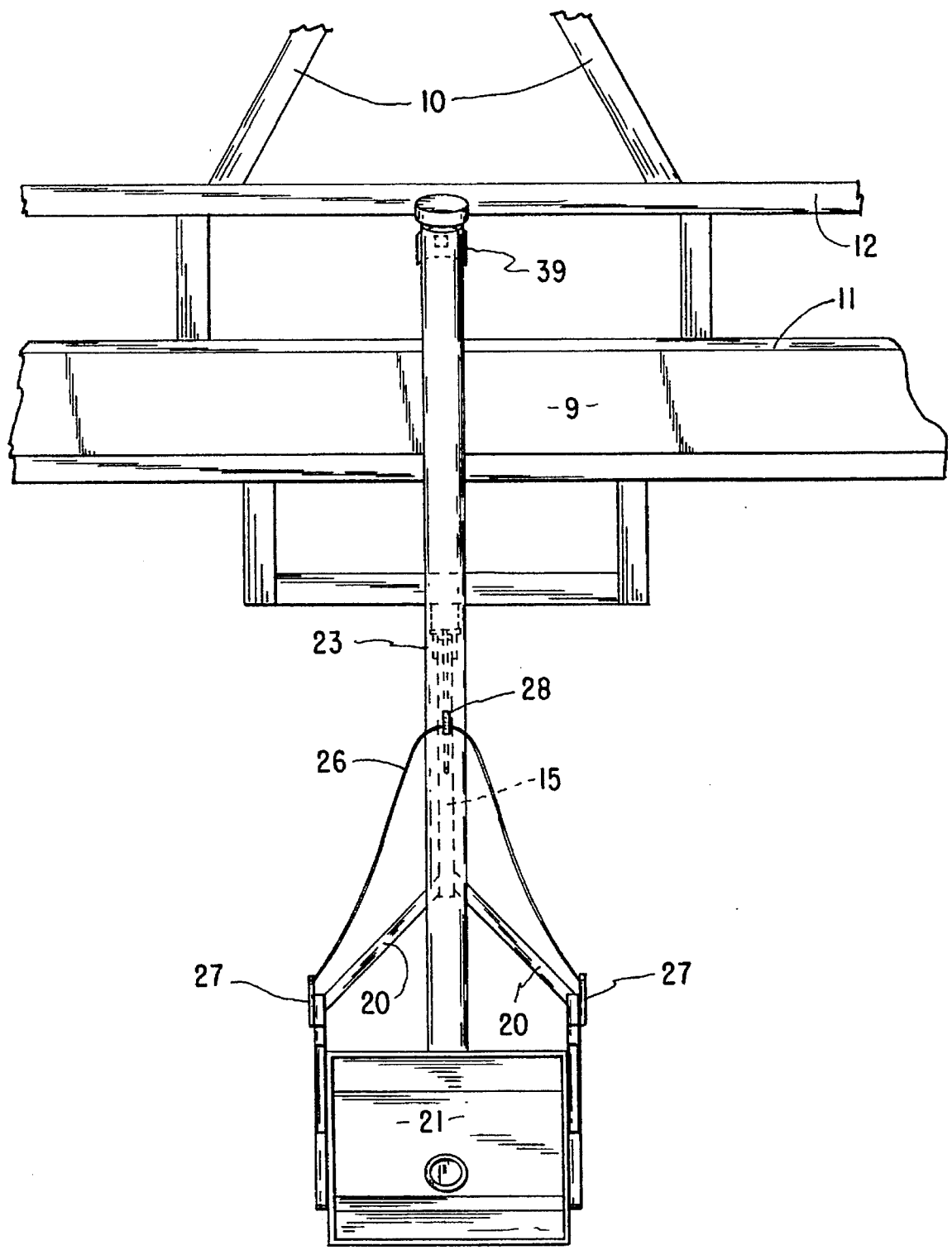
FIG. 3 is a top view from line 3—3 of FIG. 2.

When the loading of the bin 11 is complete, the hydraulic system 17 can again be actuated to raise the hopper 21. This movement causes the spout 30 to drop, and the tube of the elevator 23 can then be guided into the yoke 35 and block 36. Resting there, the elevator can be transported with the seeder. Normally, this position causes some relaxation of the cable 26 as shown in FIGS. 1 and 3.

It is now obvious that the invention provides a convenient device for filling the bin of a material spreading machine.

I claim as my invention:

1. In combination with a distribution device for particulate material having a material bin mounted on a frame, elevator means for filling said bin comprising an elevator including a trough for holding particulate material and means in said trough to move said material, mounting means for said elevator attached to said trough and pivotally connected to said frame on a substantially horizontal axis, said elevator having discharge means at the upper end of said elevator adapted to discharge into said bin and a lower end opposite said discharge means, hopper means attached to said mounting means adjacent said lower end of said elevator, means for pivoting said lower end of said elevator pivotally connected on a nearly vertical axis to said hopper means and being open to said hopper means whereby particulate material in said hopper means will drop into said lower end of said elevator, and whereby said upper end pivots about said means for pivoting for lateral movement of said upper end across said bin to provide nearly uniform distribution of material in said bin.

2. The combination of claim 1 in which power means is connected between said mounting means and said frame whereby said elevator can be moved from a lower transport position to a raised use position.

3. The combination of claim 2 in which cable means is connected to said mounting means and is slidably engaged with said trough whereby said cable supports said trough in said use position but also allows movement across the bin.

4. The combination of claim 2 in which rest means are mounted on said frame in position to support said trough in said transport position.

5. The combination of claim 1 in which said bin is an elongated rectangular shape transverse of said frame and said discharge means includes a flexible tube mounted to allow said flexible tube to discharge into said bin despite the displacement caused by the arcuate movement of said discharge means across the elongated rectangle of said bin.

* * * * *